United States Patent [19]  [11] 3,916,805
Kalfadelis et al.  [45] Nov. 4, 1975

[54] INCINERATION OF NITROGENOUS MATERIALS

[75] Inventors: Charles D. Kalfadelis; Alvin Skopp, both of Jerusalem, Israel

[73] Assignee: Exxon Research & Engineering Co., Linden, N.J.

[22] Filed: Dec. 28, 1973

[21] Appl. No.: 429,183

[52] U.S. Cl. .............. 110/7 R; 23/288 S; 423/239; 110/1 J; 110/8 F
[51] Int. Cl.² .......................................... F23G 7/00
[58] Field of Search ............ 110/1 H, 1 K, 1 J, 8 R, 110/8 F, 7 R, 28 S; 122/4 D; 423/210.5, 239; 23/277, 288 S; 48/211, 212, 213

[56] References Cited
UNITED STATES PATENTS
| | | | |
|---|---|---|---|
| 2,354,747 | 8/1944 | Epstein et al. | 110/7 |
| 3,195,608 | 7/1965 | Voorheis et al. | 110/7 X |
| 3,306,236 | 2/1967 | Campbell | 110/8 |
| 3,357,375 | 12/1967 | Brophy | 110/7 |
| 3,717,700 | 2/1973 | Robison et al. | 110/1 X |
| 3,746,498 | 7/1973 | Stengel | 110/1 X |
| 3,759,036 | 9/1973 | White | 110/1 X |
| 3,818,846 | 6/1974 | Reese | 110/8 |

Primary Examiner—Kenneth W. Sprague
Attorney, Agent, or Firm—Byron O. Dimmick

[57] ABSTRACT

A process for incineration of nitrogenous waste materials in a manner which minimizes $NO_x$ pollution. A nitrogenous waste material, such as TNT, is burned with a fuel and less than a stoichiometric quantity of air in the presence of a catalyst in a fluid bed. Secondary air is added to the gaseous products, and the resulting gas mixture is burned to yield a stack gas which has minimal amounts of $NO_x$, carbon monoxide and hydrocarbons. Nickel or a compound thereof is preferred as the catalyst.

18 Claims, 1 Drawing Figure

INCINERATION OF NITROGENOUS MATERIALS

BACKGROUND OF THE INVENTION

The invention herein described was made in the course of or under a contract, or subcontract thereunder, (or grant) with the Department of the Army.

This invention relates to processes for the disposal of nitrogenous waste materials, particularly explosives, propellants, and other organic nitrogenous waste materials. More particularly, this invention relates to a process for the controlled incineration of nitrogenous waste materials in a manner which minimizes atmospheric pollution by nitrogen oxides.

It has been common practice to dispose of organic nitrogenous waste materials, including explosives such as TNT, and propellants such as nitrocellulose by incineration of the waste material in the open air. Disposal methods include burning in an open field, in a sand pit, and on a concrete pad. Such burning methods result in the formation of considerable quantities of nitrogen oxides ($NO_x$), and also frequently lead to pollution of the soil with unburned or partially combusted residues. A recent article by Irving Forsten in "Environmental Science & Technology," Vol. 7, pages 806–810 (Sept. 1973) summarizes the air and water pollution problems, and some recent methods for cleaning up waste from explosives manufacture and includes a brief discussion of certain features of the present invention.

Incineration of combustible solid wastes in non-catalytic fluid bed processes using both primary and auxiliary air is known in the art. See, for example, French Pat. No. 2,091,161 (Jan. 14, 1972), which discloses a fluid bed reactor for the combustion of waste materials, such as oil shale, without the production of noxious odors. U.S. Pat. No. 3,366,080 (Jan. 30, 1968) to Albertson describes a reactor for the non-catalytic fluidized bed incineration of organic waste material, such as dewatered sewage sludge containing approximately 15–50% solids and the remainder water. This reactor uses auxiliary fuel, but all of the air is admitted as primary air beneath the base of the fluidized bed. Another reference of interest is U.S. Pat. No. 2,605,178 (July 29, 1952) to Hemminger, which discloses a process for production of combustible gas, i.e., a mixture of carbon monoxide and hydrogen, from bituminous materials such as tar, pitch, low grade coal, and shale, in a fluidized bed. While secondary oxygen may be admitted above the fluidized bed, the total amount of oxygen is less than stoichiometric, since the purpose is to produce a combustible gas.

The combustion of a nitrogenous material with an excess of primary air and with the use of auxiliary fuel leads to the production of unacceptably high quantities of nitrogen oxides in the gaseous effluent, as will be shown later in this specification and particularly in the Examples. Two-stage noncatalytic combustion, with partial burning in the presence of less than stoichiometric quantity of oxygen in a first fluid bed stage followed by complete combustion with auxiliary air in a second stage, results in only a modest decrease in nitrogen oxide production, with $NO_x$ effluent levels still unacceptably high, as will also be shown in the specification and particularly in the Examples.

Methods for the catalytic treatment of gaseous nitrogen oxides produced in nitric acid manufacture and in other processes, are also known. As an example of such catalytic treatment method, attention is called to U.S. Pat. No. 2,924,504 to Reitmeyer et al, in which air and enough methane or other reducing gas to render the resulting gas mixture net reducing are added to a nitric acid plant tail gas stream containing nitrogen oxides, and the resulting net reducing gas mixture is passed through a fixed catalyst bed at an inlet temperature not over 1500°F. The outlet temperature is preferably in the range of 1500° to 1900°F. Iron, cobalt, nickel and copper supported on an inert refractory carrier (e.g., alumina) are disclosed as catalysts.

SUMMARY OF THE INVENTION

According to this invention, a nitrogenous material is disposed of without substantial nitrogen oxide formation by introducing the nitrogenous material into a fluidized bed reduction zone containing a catalyst for the reduction of $NO_x$, decomposing the nitrogenous material under reducing conditions in the presence of said catalyst in said reduction zone, and withdrawing gaseous products of partial oxidation and decomposition from said reduction zone.

According to a preferred embodiment of this invention, combustion is carried out in two stages. The nitrogenous material to be disposed of, auxiliary fuel where required, and a substoichiometric quantity of oxygen (usually in the form of air) are admitted to a first fluid bed stage, where partial combustion takes place in the presence of a catalyst. Then secondary oxygen (also usually in the form of air) is added in an amount in excess of that required to complete the combustion of the gaseous products formed in the first stage. The overall result is complete decomposition of the nitrogenous material with the formation of a stack gas containing only small and environmentally acceptable amounts of nitrogen oxides, carbon monoxide, and hydrocarbons.

THE DRAWING

In the drawing, the sole FIGURE is a diagrammatic illustration of a reactor and associated equipment for carrying out the process of this invention.

DESCRIPTION OF THE PREFERRED EMBODIMENT

Figure 1:
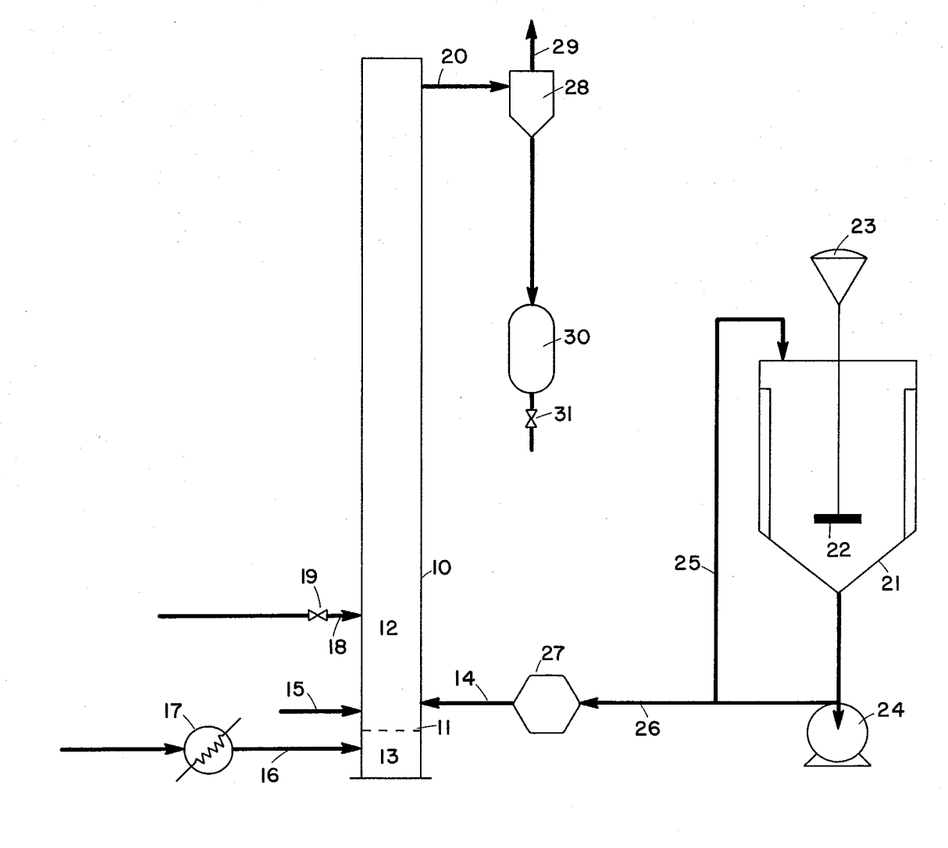

This invention will be described with particular reference to the disposal of aqueous slurries of explosives in the apparatus shown in the sole FIGURE of the drawing. TNT ($\alpha$-trinitrotoluene) will be used for the purpose of illustration.

Referring to the sole FIGURE of drawing, 10 is a vertical fluid bed reactor having a perforated distributor grid 11 near its base for supporting a bed 12 of finely divided solid particles of catalyst, inert refractory material, or both. Below the distributor grid 11 is an air plenum chamber 13. A feed inlet line 14 for admitting an aqueous slurry of TNT or other nitrogenous material, and an auxiliary fuel inlet line 15, are provided for the fluid bed 12 a short distance above distributor grid 11. A primary air inlet line 16 communicates with the air plenum chamber 13. This air line 16 has a preheater 17, shown here as an electrical preheater. Above the feed inlet line 14 and auxiliary fuel inlet line 15, but below the top of bed 12 when the bed is in its expanded or fluidized condition, is a secondary air inlet line 18. The secondary air line 18 is controlled by a shutoff valve 19. An overhead outlet line 20 is provided at the top of the reactor 10 for removing gaseous reaction products.

The apparatus of the present invention also includes a feed tank 21 in which an aqueous slurry of TNT or other explosive, propellant, or waste nitrogenous compound is prepared. This tank is provided with a stirrer 22 driven by a motor 23. This slurry feed system also includes a centrifugal pump 24, a recirculation line 25 for returning part of the slurry from the outlet of pump 24 to the top of tank 21, and a slurry feed line 26 for feeding the aqueous slurry to the inlet of a metering pump 27. The metering pump 27 provides for feeding the aqueous slurry into the reactor at the desired rate.

The gaseous reaction products and any fines which are carried overhead from the fluid bed 12 pass from overhead outlet line 20 to a cyclone separator 28. Gases are vented to the atmosphere via vent 29. Separated solids are conveyed from the cyclone separator 28 to a solids receiver 30. These solids may be returned to the reactor 10 either periodically or continuously, or may be discarded, as desired. The solids receiver 30 is provided with an outlet line having a shutoff valve 31.

In a preferred mode of operation according to this invention, an aqueous slurry of TNT, an auxiliary fuel (propane will be used for purposes of illustration), and a substoichiometric quantity of air are supplied to the reactor 10 through feed line 14, auxiliary fuel line 15, and primary air line 16, respectively. The reactor bed 12 contains a catalyst, preferably nickel, supported on a suitable carrier, such as tabular alumina, and may also contain finely divided inert refractory material, such as alpha-alumina. Only a small quantity of catalyst is required for the purpose of this invention, so that the reactor bed may be largely inert refractory material. The TNT (or other nitrogenous feed material) and the auxiliary fuel are partially combusted in the reduction zone with primary air (i.e., the portion of fluidized bed 12 below secondary air inlet 18), and the water associated with the aqueous feed slurry is evaporated, yielding a gaseous mixture which contains carbon monoxide, carbon dioxide, hydrogen, water vapor, and elemental nitrogen. This gaseous mixture travels upwardly through the reactor bed at a superficial velocity sufficient to maintain the bed in a fluidized state. By using a sub-stoichiometric quantity of air in the reduction zone, a reducing atmosphere which is conducive to the formation of nitrogen with only small and environmentally acceptable amounts of nitrogen oxides is maintained. Secondary air is added through secondary air inlet line 18 in an amount sufficient to oxidize the carbon monoxide and hydrogen in the gases formed in the reduction zone to carbon dioxide and water vapor, respectively. Ordinarily the overall amount of air supplied to the system through primary air inlet 14 and secondary air inlet 18 is in excess of the stoichiometric amount. The term, "stoichiometric amount" referring to air or oxygen quantities herein, is used to denote the theoretical or stoichiometric amount required to oxidize all carbon, hydrogen, and nitrogen introduced into the reactor, in either the nitrogenous feed or in the auxiliary fuel, to carbon dioxide, water vapor, and elemental nitrogen, respectively. The admission of secondary air through inlet line 18 produces a sharply defined reduction zone below that inlet and an oxidation zone above that inlet.

The two-stage mode of operation just described provides an efficient process for the controlled decomposition of nitrogenous materials such as TNT in an environmentally acceptable manner which produces minimal quantities of nitrogen oxides, carbon monoxide and unburned hydrocarbons in the flue gas which is vented to the atmosphere.

A second mode of operation according to this invention is similar to the preferred mode described above except that no secondary air is used. That is, an aqueous slurry of nitrogenous material (e.g., TNT), auxiliary fuel, and a substoichiometric quantity of air are introduced into reactor 10 via inlet lines 14, 15 and 16, respectively. The reactor has a fluidized catalyst bed 12 which contains a supported nickel catalyst, and which may also contain inert refractory material (e.g., alumina), as in the first embodiment. The gaseous mixture obtained in this embodiment contains carbon monoxide, carbon dioxide, hydrogen, water vapor, elemental nitrogen, small amounts of unburned hydrocarbons, but very small amounts of nitrogen oxides. This gas mixture is withdrawn through overhead line 20. This embodiment of the invention, like the preferred embodiment, gives very low levels of $NO_x$ in the product gas. However, the product gas does contain CO and unburned hydrocarbons, due to the absence of the second stage oxidation. This one-stage mode of operation is useful when the disposition of a nitrogenous waste material and the production of a combustible product gas in a single process are desired.

One-stage operation with an excess of primary air but otherwise identical to the second mode of operation described above gives excessive quantities of $NO_x$ in the effluent gas. The amounts of effluent CO and hydrocarbons are small, due to the oxidizing conditions which prevail throughout fluid catalyst bed 12. This mode of operation shows that it is essential to maintain a reducing atmosphere in the lower portion of fluid catalyst bed 12, when decomposition of the nitrogenous material takes place, in order to achieve the desired suppression of $NO_x$ formation.

It is essential to use a catalyst in order to achieve low $NO_x$ effluent levels. If the two-stage process described above is carried out except for the absence of any catalyst in fluid bed 12, only slight reductions in $NO_x$ effluent levels compared to one-stage operations using excess primary air are achieved.

The invention will now be further described with respect to additional embodiments.

This invention is applicable generally to the decomposition of non-gaseous nitrogenous materials. The term, "non-gaseous," as used herein refers to materials which are either solid or liquid at room temperature (25°C.). Both organic and inorganic nitrogenous materials can be decomposed with minimal $NO_x$ formation according to this invention. Organic materials include explosives such as 2,4,6-trinitrotoluene (TNT) as already mentioned, cyclotrimethylenetrinitramine (also known as RDX and as hexahydro-1,3,5-trinitro-5-triazine), and cyclotetramethylenetetranitramine (HMX); propellants such as nitrocellulose, nitroglycerin and nitroguanidine; and industrial nitrogenous waste materials. Other inorganic materials such as nitric acid, various ammonium salts, and nickel nitrate can also be disposed of according to this invention.

Oil shale or low sulfur coal can also be treated according to this invention. In this regard, finely ground oil shale can be paartially burned in a single stage process such as that described above in order to obtain a combustible gas containing hydrogen and carbon monoxide and having a very low $NO_x$ content. Where maximum production of energy is required, as for example in steam generation for an electric power plant, oil shale can also be burned according to the two-stage process previously described. The oil shale is crushed to a suitable particle size and may be fed to the reactor by known means for feeding pulverized solids.

Propane has been disclosed as the auxiliary fuel for purposes of illustration. However, other auxiliary fuels either solid, liquid or gaseous, can be used. For example, natural gas, liquefied petroleum gas (a mixture consisting primarily of propane and butane), gas oil, distillates, diesel oil, heating oil such as No. 2 heating oil, and residual oils, can be used. Pulverized coal can also be used as a source of fuel. It is preferable to use a low sulfur fuel, since high sulfur fuels may tend to poison a nickel catalyst.

Air, essentially pure oxygen, or oxygen enriched air may be used as the source of oxygen for the process. Air is ordinarily preferred because it is the cheapest oxygen source.

The temperature in the reduction zone is at least about 1200°F., ordinarily about 1200° to about 2500°F., and preferably from about 1600° to about 2000°F. Efficient catalytic reduction of nitrogenous decomposition products to elemental nitrogen takes place only at temperatures above about 1200°F., and minimum nitrogen oxide formation is achieved when the reduction zone temperature is above about 1600°F. On the other hand, the temperature in the oxidation zone should not exceed about 2500°F., in order to avoid or at least minimize conversion of atmospheric nitrogen in combustion air to nitrogen oxide; when a single fluid catalyst bed encompasses both the oxidation and reduction zones, as shown in the preferred embodiment, the maximum temperature in the reduction zone is also about 2500°F. Actually, it is ordinarily preferred to operate at temperatures below about 2000°F., since this permits a wider choice of materials for constructing the reactor and associated equipment without any sacrifice of efficiency in nitrogen oxide abatement.

The present process is ordinarily carried out at substantially atmospheric pressure for economic reasons. However, both subatmospheric pressures and superatmospheric pressures may be used if desired.

The desired operating temperature and the reducing atmosphere in the reduction zone are preferably both maintained by the partial combustion of an auxiliary fuel within the first stage of the fluid bed reactor as has already been described. However, if desired, the necessary heat to maintain the process can be supplied by indirect heat exchange, and the required reducing atmosphere can be obtained by forming a reducing gas externally to the reactor.

Ordinarily the decomposition of a nitrogenous material as practiced in the present invention is not normally self-sustaining, even though some heat is liberated in the partial oxidation of carbon and hydrogen constituents of an organic nitrogenous material. This is due primarily to the fact that large amounts of water are ordinarily fed to the reactor as a slurry medium for the nitrogenous material, and the heat requirements for evaporating this water exceed the amount of heat liberated by the partial oxidation of carbon and hydrogen in the nitrogenous material. The large amounts of water are particularly desirable in the case of explosives to ensure safe handling. However, some nitrogenous materials, notably oil shale and non-explosive industrial nitrogenous waste materials, can be handled in the dry state. No auxiliary fuel is required in those instances in which the heat liberated by the partial oxidation of the nitrogenous material is sufficient to maintain the reaction temperature within the desired range.

Instead of operating both stages of the two-stage process of this invention in the same reactor vessel and fluid catalyst bed, as disclosed in the preferred embodiment, it is possible to utilize a separate reactor vessel for the second or oxidation stage. In this case the air or other oxygen-containing gas is ordinarily fed to the process between the two reactor vessels. Also in this case the second stage may be operated either with or without a catalyst as desired. This mode of operation also permits the use of operating temperatures above 2500°F. in the first or reduction stage, since nitrogen oxides do not form to any significant extent under reducing conditions regardless of temperature. However, it is ordinarily preferred to operate the reduction zone at temperatures below 2500°F. for more economical operation.

Nickel has been disclosed as the preferred catalyst in the process of this invention. Other catalysts such as cobalt, iron and copper, all of which are known to be suitable for the reduction of nitrogen oxide to nitrogen under reducing conditions, can be used as the catalyst if desired. However, results using a cobalt catalyst have been found to be much less favorable than those obtained using a nickel catalyst, as will be shown in the Examples. Iron and copper are likewise also inferior to nickel in terms of $NO_x$ effluent levels achieved. Noble metal catalysts, such as platinum, which are also known as suitable catalysts for the reduction of nitrogen oxides can also be used in the present invention. The nonnoble metal catalysts of this invention, while designated in terms of the metallic constituent, may actually be in the form of the free metal, the metal oxide, or a catalytically active metal salt, or a mixture of all or any two of these. The exact form of the metal catalyst in the reduction zone has not been determined.

Best results are ordinarily obtained when the catalyst is supported on a refractory carrier. Suitable carrier materials include tabular alumina (which is primarily alpha-alumina), sand, or silicon oxide. A liquid catalyst can be used in place of the preferred solid catalyst if desired. For example, aqueous nickel nitrate, dissolved in the water in which the nitrogenous material is slurried, has been found to give good results. Other water soluble salts of catalytically active metals, e.g., cobalt nitrate, ferric nitrate and copper nitrate, can also be fed in aqueous solution to the reactor with good results. When an aqueous catalyst of this type is used, the solid fluid bed material may consist entirely of inert refractory material; no solid catalyst is needed in this instance.

No line for continuous return of fine solids, which may include catalyst, from receiver 30 to reactor 10 has been indicated in the drawing. However, such a line may be provided, in which case fine solids may be returned from receiver 30 on a continuous basis without shutting down the reactor 10, rather than on an intermittent basis with reactor shutdown.

This invention will now be described further with reference to the Examples which follow:

EXAMPLES

The reactor used in all of the Examples which follow was a vertical tubular reactor as shown in the sole FIGURE of the drawing, having an inside diameter of 6 inches and a height of 9 feet, and made of an alloy identified as RA-330, an austenitic, non-hardenable heat and corrosion resistant alloy of iron, nickel and chromium, made by Rolled Alloys Inc. of Detroit, Michigan. Distributor grid 11, located 12 inches above the base of the reactor, divided the reactor into an air plenum chamber 13 below the grid and a combustor section above the grid. The reactor was equipped with a nitrogenous material feed inlet 14 and a fuel inlet 15, both 3 inches above the grid, a primary air inlet 16 communicating with the plenum chamber, and a secondary air inlet 18 located 36 inches above the distributor grid 11.

Each of the Examples herein describes a separate run. Fuel and air rates were changed from time to time during each run to achieve different modes of operation.

Basically, all modes of operation used in the runs described in the Examples can be grouped into three categories, as follows: (1) one-stage operation using an excess of primary air (for control or comparison purposes); (2) one-stage operation, using a sub-stoichiometric quantity of primary air and no secondary air; and (3) two-stage operation, using both primary and secondary air, the quantity of primary air always being less than stoichiometric. The last two modes of operation, when conducted in the presence of a catalyst, are modes of operation according to the present invention. An asterisk beside the mode of operation number in the tables accompanying the examples indicates a mode of operation which is not according to this invention.

EXAMPLE 1

6 pounds of Girdler (chemetron) G-65S, 25 percent (nominal, by weight) nickel on alumina catalyst in the form of ¼-inch spheres was ground to pass a 14 mesh screen. The ground catalyst and 40 pounds of Alcoa T-61 tabular alumina (minus 14 mesh), were added to the reactor. These formed a bed having a depth of about 2 feet when no gas was flowing through the reactor. About 42 percent of the nickel on alumina catalyst as charged had a particle size less than 420 microns, and about 25 percent was smaller than 149 microns. Tabular alumina is sintered and thoroughly shrunk, with coarse, well-developed crystals of alpha alumina. The tabular alumina particles as charged had no more than 1.1 percent smaller than 420 microns and no more than 0.1 percent smaller than 149 microns.

After the reactor was brought up to operating temperature (1200°F.), a feed slurry consisting of 10 wt. percent of alpha-trinitrotoluene (TNT) in water; propane (auxiliary fuel), and air were fed to the reactor in the amounts indicated in Table I below. Two modes of operation, designated 1A and 1B, were carried out during the course of the run described in this example by altering the propane and air rates during the run. In mode 1A (a comparison mode) an excess of air, all fed as primary air, was used; in mode 1B (according to this invention), both primary and secondary air were used, the overall quantity of air being in excess of theoretical, but the amount of primary air being less than theoretical. The temperature at different points throughout the bed and above the bed was obtained by means of thermocouples; average temperatures for both the lower bed section (below the secondary air inlet) and the upper bed section (above the secondary air inlet) are shown in Table I. Very little variation in temperature between different points in a bed section was detected.

Flue gas was removed overhead and analyzed. Analyses are shown in Table I.

| Run No. | | 1A* | 1B |
|---|---|---|---|
| No. of stages | | 1 | 2 |
| Lower Bed Temp. (°F.) | | 1600 | 1725 |
| Upper Bed Temp. (°F.) | | 1600 | 1745 |
| TNT Rate (Dry lbs./hr.) | | 0.63 | 0.63 |
| Water Rate (lbs./hr.) | | 5.71 | 5.71 |
| Propane Rate (SCFH) | | 13.47 | 17.34 |
| Total Air Rate (SCFH) | | 409.8 | 440.2 |
| Pct. Theo. Air as Primary Air | | All | 62.9 |
| Pct. Theo. Air Overall | | 120.8 | 119.8 |
| Flue Gas Analysis | | | |
| $O_2$ | (%) | 3.8 | 3.7 |
| $CO_2$ | (%) | 12.1 | 12.0 |
| CO | (ppm) | 250 | 40 |
| NO | (ppm) | 2500 | 47 |
| $NO_x$ | (ppm) | 2900 | 57 |
| HC | (ppm) | 100 | <10 |

The data in Table I show significantly lower concentrations of nitrogen oxides, carbon monoxides, and hydrocarbons in the flue gas obtained in mode 1B than in the flue gas obtained in mode 1A. Mode 1B was conducted according to the present invention, data for mode 1A are shown for comparison purposes. This example shows that highly effective control of pollutants is obtained by using a nickel catalyst and by operating with two stages, using less than the theoretical quantity of oxygen for combustion in the first stage (thereby obtaining only partial oxidation and maintaining reducing conditions in this first stage) while completely oxidizing the first stage effluent gas in the second stage. Even when a nickel catalyst is used, the amount of pollutants, particularly nitrogen oxides, is unacceptably high in single stage operation using an excess of air for combustion.

EXAMPLE 2

6 pounds of Girdler (Chemetron) G-56B nominal 25 percent (by weight) nickel-on-alumina catalyst, initially in the form of ⅝ inch by ⅜ inch rings and ground to pass through a 14-mesh screen, and 40 pounds of Alcoa T-61 tabular alumina (minus 14 mesh), were charged to the reactor.

Propane, primary air, and an explosive feed slurry comprising 10 percent by weight of alpha trinitrotoluene in water, were fed to the lower portion of the fluid bed in the manner described in Example 1, after the fluid bed had been brought to operating temperature. Seven modes of operation, designated 2A through 2G inclusive, were carried out in succession in the run described in this Example. Secondary air was introduced into the fluid bed in two of these modes of operation, 2F and 2G; which are according to the invention. All of the air was admitted as primary air in the other five modes. Modes 2A and 2E were control modes, in which an excess of air was used; while modes 2B, 2C and 2D according to the invention utilized less than the theoretical quantity of air. The flue gas leaving the reactor was analyzed.

Data and results are given in Table II below.

TABLE II

|  | 2A* | 2B | 2C | 2D | 2E* | 2F | 2G |
|---|---|---|---|---|---|---|---|
| No. of Stages | 1 | 1 | 1 | 1 | 1 | 2 | 2 |
| Lower Bed Temp. (°F.) | 1650 | 1680 | 1705 | 1745 | 1785 | 1765 | 1765 |
| Upper Bed Temp. (°F.) | 1650 | 1680 | 1705 | 1745 | 1785 | 1760 | 1760 |
| TNT Rate (Dry lbs./hr.) | 0.82 | 0.82 | 0.82 | 0.82 | 0.82 | 0.82 | 0.82 |
| Water Rate (lbs./hr.) | 7.38 | 7.38 | 7.38 | 7.38 | 7.38 | 7.38 | 7.38 |
| Propane Rate (SCFH) | 12.94 | 16.69 | 16.94 | 16.69 | 17.72 | 17.31 | 18.70 |
| Total Air Rate (SCFH) | 386.6 | 390.2 | 389.2 | 390.2 | 476.1 | 564.7 | 591.2 |
| Pct. Theo. as Primary Air | 112.9 | 90.4 | 89.0 | 90.4 | 104.4 | 70.8 | 79.0 |
| Pct. Theo. Air Overall | 112.9 | 90.4 | 89.0 | 90.4 | 104.4 | 126.5 | 123.3 |
| Flue Gas Analysis |  |  |  |  |  |  |  |
| $O_2$ (%) | 2.5 | 0.0 | 0.0 | 0.0 | 0.9 | 4.7 | 4.2 |
| $CO_2$ (%) | 13.2 | — | — | — | 14.1 | 11.5 | 11.8 |
| CO (ppm) | 95 | 4100 | 5000 | >5000 | 750 | 650 | 140 |
| NO (ppm) | 1940 | 115 | 12 | 3 | 430 | 7 | 35 |
| $NO_x$ (ppm) | 2400 | 130 | 25 | 7 | 445 | 8 | 36 |

The data in Table II above show substantially lower nitrogen oxide emissions in modes 2B, 2C, 2D, 2F and 2G according to this invention, than in control modes 2A and 2E in which excess primary air was used. Of course, there are some differences in the concentration of nitrogen oxides and of carbon monoxide emitted at different bed temperatures and with different percentages of theoretical air as primary air. Compare, for example, mode 2F versus 2G. The high CO emissions in modes 2B, 2C and 2D are the result of using less than the theoretical quantity of overall air, so that not all of the carbon present in the propane and the TNT could be oxidized to carbon dioxide.

EXAMPLE 3

Used Alcoa T-61 (minus 14 mesh) tabular alumina (46 pounds) was charged to the reactor.

The run described in this Example included four modes of operation, designated 3A through 3D inclusive, including a one-stage mode (3A) and three 2-stage modes. Control modes operation 3A and 3B, in which no catalyst was used, were carried out by introducing a 10 percent (by weight) aqueous TNT slurry, propane, and primary air into the lower portion of the fluid bed, and introducing secondary air in mode 3B in the upper portion of the fluid bed, in the manner described in Example 1. Modes 3C and 3D were conducted in the same manner as 3B, except that the feed slurry contained dissolved nickel nitrate in addition to undissolved TNT. Thus, the nickel catalyst in this example was supplied in the form of dissolved nickel nitrate, rather than being in solid nickel or nickel oxide form supported on a carrier.

Data and results are shown in Table III.

TABLE III

|  | 3A* | 3B | 3C | 3D |
|---|---|---|---|---|
| $Ni(NO_3)_2$ in feed slurry | No | No | Yes | Yes |
| Number of stages | 1 | 2 | 2 | 2 |
| Lower Bed Temp. (°F.) | 1670 | 1640 | 1670 | 1715 |
| Upper Bed. Temp. (°F.) | 1670 | 1860 | 1860 | 1960 |
| TNT Rate (Dry lbs./hr.) | 0.92 | 0.92 | 0.92 | 0.92 |
| Water Rate (lbs./hr.) | 8.31 | 8.31 | 8.31 | 8.31 |
| Propane Rate (SCFH) | 18.51 | 18.20 | 19.22 | 21.53 |
| Total Air Rate (SCFH) | 576.4 | 586.0 | 584.1 | 600.7 |
| Pct. Theo. as Primary Air | 120.2 | 60.2 | 58.2 | 51.2 |
| Pct. Theo. Air Overall | 120.2 | 124.2 | 117.7 | 109.0 |
| Flue-Gas Analysis |  |  |  |  |
| $O_2$ (%) | 3.7 | 4.3 | 3.4 | 1.9 |
| $CO_2$ (%) | 12.2 | 11.8 | 12.4 | 13.4 |
| CO (ppm) | 960 | 320 | 190 | 1480 |
| NO (ppm) | 2500 | 1070 | 280 | 68 |
| $NO_x$ (ppm) | 2800 | 1250 | 295 | 78 |
| HC (ppm) | 150 | 50 | <10 | 30 |

The above data show that a substantial reduction in $NO_x$ is obtained by using two-stage operation with insufficient air in the first stage, as opposed to single stage operation with excess air (compare modes 3A and 3B), but that highly effective $NO_x$ control is obtained only when a catalyst is used as in modes 3C and 3D. The data in runs 3C and 3D suggest that slightly more effective $NO_x$ control is obtained at lower bed temperatures over 1700° rather than below 1700° (a similar effect is noted also in Example 2). The data on the relative effectiveness of dissolved nickel nitrate as a catalyst (this example) as opposed to a supported nickel catalyst (Examples 1 and 2) appear to be inconclusive; however, the data in all three examples show that nickel in either form is a highly effective catalyst for $NO_x$ reduction.

EXAMPLE 4

This example describes the decomposition of nitric acid with low nitrogen oxide emissions.

The reactor bed in this example was the used reactor bed from Example 1. This bed was originally composed of six pounds of 25 percent (by weight) nickel on alumina (Girdler G-65S) and 40 pounds of tabular alumina (Alcoa T-61).

Four modes of operation, including two one-stage modes 4A and 4D, and two two-stage modes 4B and 4C, were carried out in the run described in this example. In all four modes of operation, propane, air, and a solution of reagent grade nitric acid in water comprising 4.7 pounds of 70.5 percent $HNO_3$ and 35.25 pounds of water (approximately 7.8 percent by weight $HNO_3$ overall) were fed to the lower portion of the fluid bed. An excess of primary air with no secondary air was fed in modes 4A and 4D; in modes 4B and 4C, less than the theoretical quantity of primary air was fed to the lower portion of the bed, and additional air was admitted as secondary air to the upper portion of the bed. The nitric acid was decomposed in the fluid bed, and the propane was completely oxidized in the fluid bed in modes 4A and 4D, and partially oxidized in the lower portion of the bed, with complete oxidation in the upper portion of the bed in modes 4B and 4C. The flue gas was removed overhead and analyzed. Results are shown in Table IV below.

TABLE IV

| Mode | 4A* | 4B | 4C | 4D |
|---|---|---|---|---|
| Number of Stages | 1 | 2 | 2 | 1 |
| Lower Bed Temp. (°F.) | 1650 | 1775 | 1710 | 1740 |
| Upper Bed Temp. (°F.) | 1650 | 1820 | 1900 | 1740 |
| $HNO_3$ Rate (lbs./hr.) | 0.56 | 0.56 | 0.56 | 0.56 |
| Water Rate (lbs./hr.) | 6.63 | 6.63 | 6.63 | 6.63 |
| Propane Rate (SCFH) | 16.06 | 19.39 | 21.42 | 19.13 |
| Air Rate (Total SCFH) | 424.7 | 551.4 | 555.6 | 497.6 |
| Pct. Theo. Air as Primary | 111.1 | 63.9 | 55.5 | 109.2 |
| Pct. Theo. Air Overall | 111.1 | 119.4 | 108.9 | 109.2 |
| Flue-Gas Analysis | | | | |
| $O_2$ (%) | 2.3 | 3.7 | 1.9 | 1.9 |
| $CO_2$ (%) | 12.3 | 11.4 | 12.5 | 12.5 |
| CO (ppm) | 600 | 20 | 240 | 270 |
| NO (ppm) | 3300 | 160 | 53 | 2300 |
| $NO_x$ (ppm) | 5600 | 207 | 72 | 3300 |
| HC (ppm) | 45 | <10 | <10 | <10 |

Modes 4B and 4C according to this invention show excellent reductions in $NO_x$ emissions as compared to control modes 4A and 4B.

EXAMPLE 5

5 pounds of cobalt on gamma alumina catalyst in the form of ⅛ inch cylindrical pellets, containing a nominal 18 wt. percent by weight of Co, and 40 pounds of Alcoa T-61 tabular alumina were charged to the reactor. The reactor was preheated to 1200°F.

An aqueous feed slurry of 10 percent by weight TNT, propane, and air were fed to the reactor at the rates indicated in Table V below. Propane and air feed rates were periodically changed to give six operating modes, designated 5A through 5F inclusive. Mode 5A was a control mode employing an excess of primary air with no secondary air. The other modes were according to the invention, employing a substoichiometric quantity of primary air plus secondary air. Flue gas was removed overhead and analyzed.

Data and results are shown in Table V below:

TABLE V

| Operating Mode (Run No.) | 5A* | 5B | 5C | 5D | 5E | 5F |
|---|---|---|---|---|---|---|
| Lower Bed Temp. (°F.) | 1740 | 1805 | 1815 | 1860 | 1875 | 1800 |
| Upper Bed Temp. (°F.) | — | 1800 | 1840 | 1880 | 1880 | 1955 |
| Explosive Rate, (Dry lbs./Hr.) | 0.46 | 0.46 | 0.46 | 0.46 | 0.46 | 0.46 |
| Water Rate (Lbs./Hr.) | 4.10 | 4.10 | 4.10 | 4.10 | 4.10 | 4.10 |
| Propane Rate (SCFH) | 13.63 | 14.12 | 19.08 | 18.41 | 19.26 | 22.07 |
| Total Air Rate (SCFH) | 390.2 | 503.5 | 483.0 | 518.5 | 523.0 | 558.5 |
| Pct. Theo. as Primary Air | 113.6 | 75.0 | 55.7 | 53.1 | 59.6 | 50.9 |
| Pct. Theo. Air Overall | 113.6 | 141.7 | 102.0 | 113.4 | 109.5 | 102.6 |
| Flue-Gas Analysis | | | | | | |
| $O_2$ (%) | 2.7 | 6.5 | 0.5 | 2.7 | 2.0 | 0.6 |
| $CO_2$ (%) | 12.7 | 10.0 | 13.9 | 12.5 | 12.9 | 13.8 |
| CO (ppm) | 400 | 40 | >5000 | 700 | 2750 | 5000 |
| NO (ppm) | 1600 | 740 | 360 | 440 | 420 | 310 |
| $NO_x$ (ppm) | 1700 | 760 | 440 | 500 | 460 | 330 |
| HC (ppm) | 900 | 300 | 1800 | 700 | 870 | 1600 |
| Superficial Bed Vel. (Ft./Sec.) | 3.0 | 3.7 | 3.7 | 4.0 | 4.0 | 4.5 |

Results indicate that cobalt is an effective catalyst in the present process, but not as effective as nickel.

EXAMPLE 6

46 pounds of catalyst identical to that used in Example 4 was charged to the reactor. A 10 percent (by weight) slurry of RDX in water, propane, and air were then fed to the reactor. Feed rates are given in Table VI below. Five modes of operation, designated 6A, 6B and 6C, 6D and 6E were carried out. In the first, 6A, only primary air was used while in the remaining four, both primary and secondary air were used. In all modes, flue gas was withdrawn overhead and analyzed.

Results are shown in Table VI below:

air were also fed to the reactor. Five operating modes, designated 7A through 7E, were carried out. An excess of primary air, with no secondary air, was used in modes 7A and 7B; less than the theoretical quantity of primary air, with added secondary air, was used in modes 7C, 7D and 7E. Flue gas was withdrawn overhead and analyzed.

Results are shown in Table VII below.

TABLE VII

| Mode | 7A | 7B | 7C | 7D | 7E |
|---|---|---|---|---|---|
| Lower Bed Temp. (°F.) | 1750 | 1740 | 1710 | 1670 | 1670 |
| Upper Bed Temp. (°F.) | — | — | 1900 | 1910 | 1910 |
| Explosive Feed Slurry (Wt.%) | | 15.3 RDX | | | 12.5 RDX |
| Explosive Rate (Dry Lbs./Hr.) | | 1.24 | | | 1.02 |
| Water Rate (Lbs./Hr.) | | 6.87 | | | 6.47 |
| Catalyst Compounds (Lbs./Hr.) | | N.A. | | | 0.62 |
| Propane Rate (SCFH) | 18.67 | 16.14 | 21.17 | 21.56 | 23.40 |
| Total Air Rate (SCFH) | 483.9 | 521.8 | 589.7 | 583.3 | 644.1 |
| Pct. Theo. as Primary Air | All | All | 78.7 | 77.0 | 77.8 |
| Pct. Theo. Air Overall | 105.3 | 130.7 | 113.6 | 111.0 | 113.1 |
| Flue-Gas Analysis | | | | | |
| O$_2$ (%) | 1.1 | 5.2 | 2.7 | 2.2 | 2.6 |
| CO$_2$ (%) | 13.7 | 11.0 | 12.5 | 12.7 | 12.4 |
| CO (ppm) | 4500 | 1970 | 1000 | 1050 | 625 |
| NO (ppm) | 1200 | 1400 | 780 | 300 | 150 |
| NO$_x$ (ppm) | 1400 | 1450 | 800 | 310 | 160 |
| HC (ppm) | — | — | — | — | 100 |
| Superficial Bed Vel. (Ft./Sec.) | 4.0 | 4.2 | 5.0 | 4.9 | 5.3 |

Nitrogen oxide emissions in mode 7D, compared to the much lower emissions in mode 7E, suggest that the system had not yet reached equilibrium at the time the readings for mode 7D were taken.

TABLE VI

| Operating mode | 6A | 6B | 6C | 6D | 6E |
|---|---|---|---|---|---|
| Lower Bed Temp. (°F.) | 1710 | 1670 | 1720 | 1780 | 1800 |
| Upper Bed Temp. (°F.) | — | 1830 | 1850 | 1840 | 1890 |
| Explosive Rate, (Dry lbs./Hr.) | 0.79 | 0.79 | 0.79 | 0.79 | 0.79 |
| Water Rate (Lbs./Hr.) | 7.15 | 7.15 | 7.15 | 7.15 | 7.15 |
| Propane Rate (SCFH) | 14.51 | 23.22 | 23.50 | 20.81 | 22.59 |
| Total Air Rate (SCFH) | 380.9 | 600.7 | 632.6 | 591.7 | 644.0 |
| Pct. Theo. as Primary Air | All | 55.3 | 63.1 | 64.5 | 60.2 |
| Pct. Theo. Air Overall | 107.2 | 106.8 | 111.1 | 117.1 | 117.6 |
| Flue-Gas Analysis | | | | | |
| O$_2$ (%) | 1.5 | 1.4 | 2.3 | 3.3 | 3.4 |
| CO$_2$ (%) | 13.3 | 13.2 | 12.6 | 12.0 | 11.9 |
| CO (ppm) | 610 | 4500 | 2500 | 160 | 500 |
| NO (ppm) | 1150 | 22 | 20 | 20 | 12 |
| NO$_x$ (ppm) | 1600 | 34 | 22 | 21 | 17 |
| HC (ppm) | 100 | 20 | 10 | <10 | <10 |
| Superficial Bed Vel. (Ft./Sec.) | 3.3 | 4.9 | 5.2 | 4.9 | 5.3 |

Virtual extinction of NO$_x$ in flue gas was obtained in all of the two stage modes of operation, 6B through 6E. However, note that simultaneous optimum reduction of NO$_x$, CO and hydrocarbon were obtained in mode 6D, where about 64.5 percent of theoretical air was admitted to the reactor as primary air.

EXAMPLE 7

The reactor was charged with 46.0 pounds of Alcoa T-61 tabular alumina and preheated to 1200°F.

A slurry containing 12.5 percent by weight of RDX and about 7.7 percent by weight of dissolved nickel nitrate hexahydrate, was fed to the reactor. Propane and

COMPARISON EXAMPLE A

No catalyst was used in either of the two modes of operations 8A and 8B described in this example; therefore, this example is a comparison example and not an example illustrating the present invention. The nitrogenous material in this example was TNT, which was fed to the fluid bed as a 10 percent (by weight) slurry in water. Except for the absence of a catalyst, the one-stage mode 8A and the two-stage mode 8B were conducted in the same manner as the one-stage mode 1A and the two-stage mode 1B respectively, in Example 1. Results are shown in Table VIII below:

TABLE VIII

| Mode | 8A* | 8B* |
|---|---|---|
| Lower Bed Temp. (°F.) | 1720 | 1670 |

TABLE VIII-continued

| Mode | 8A* | 8B* |
|---|---|---|
| Upper Bed Temp. (°F.) | 1720 | 1860 |
| TNT Rate (Dry lbs./hr.) | 0.69 | 0.69 |
| Water Rate (Lbs./Hr.) | 6.19 | 6.19 |
| Propane Rate (SCFH) | 24.54 | 17.94 |
| Total Air Rate (SCFH) | 662 | 481 |
| Pct. Theo. as Primary Air | 108 | 58.1 |
| Pct. Theor. Air Overall | 108 | 106 |
| Lower Bed Superficial Vel. (ft./sec.) | 4.9 | 2.7 |
| Upper Bed Superficial Vel. (ft./sec.) | 4.9 | 4.0 |
| Flue-Gas Analysis | | |
| $O_2$ (%) | 1.7 | 1.2 |
| $CO_2$ (%) | 13.2 | 13.8 |
| CO (ppm) | 2200 | 150 |
| NO (ppm) | 1300 | 975 |
| $NO_x$ (ppm) | 1320 | 975 |
| HC (ppm) | 2000 | 25 |

Comparison of the high $NO_x$ emissions in both modes of operation in this example against the much lower $NO_x$ emissions wherever a catalyst is used in the other examples points out the importance of using a catalyst in order to obtain effective $NO_x$ emission control.

What is claimed is:

1. A process for disposing of a non-gaseous nitrogeneous material without substantial nitrogen oxide formation which comprises:
   a. introducing said nitrogeneous material into a fluidized bed reduction zone containing a catalyst for the reduction of $NO_x$;
   b. contacting said nitrogeneous material in said reduction zone with less than a stoichiometric quantity of oxygen, in the presence of said catalyst; and
   c. withdrawing gaseous products of partial oxidation and decomposition from said reduction zone; said catalyst being selected from the group consisting of nickel, cobalt, iron, copper and the nitrates of said metals.

2. A process according to claim 1 including the steps of passing said gaseous products from said reduction zone to an oxidation zone, adding a secondary stream of an oxygen-containing gas in at least the theoretical quantity, and oxidizing said gaseous products to oxidation products comprising carbon dioxide and water.

3. A process according to claim 2 in which said reaction vessel contains a single fluid bed and in which said secondary stream of oxygen-containing gas is introduced into said fluid bed above the inlet for said nitrogenous material, the portion of said fluid bed above the inlet for secondary oxygen-containing gas constituting said oxidation zone and the portion of said bed below said inlet constituting said reduction zone.

4. A process according to claim 1 in which said nitrogenous material is an organic nitrogenous material.

5. A process according to claim 4 in which said organic nitrogenous material is an explosive.

6. A process according to claim 4 in which said explosive is 2,4,6-trinitrotoluene.

7. A process according to claim 5 in which said explosive is introduced in an aqueous slurry into said reduction zone.

8. A process according to claim 4 in which said organic nitrogenous material is an industrial waste material.

9. A process according to claim 4 in which said organic nitrogenous material is oil, oil shale or low-sulfur coal.

10. A process according to claim 1 in which reducing conditions are maintained in said reduction zone by partial oxidation of a fuel with less than the theoretical quantity of an oxygen-containing gas therein.

11. A process according to claim 10 in which said fuel is a carbonaceous fuel.

12. A process according to claim 11 in which said carbonaceous fuel is a hydrocarbon material.

13. A process according to claim 10 in which the quantity of oxygen is from about 50 percent to about 90 percent of the theoretical quantity.

14. A process according to claim 1 in which the temperature in said reduction zone is at least about 1200°F.

15. A process according to claim 14 in which said temperature is from about 1600° to about 2000°F.

16. A process according to claim 1 in which said catalyst is nickel or nickle nitrate.

17. A process according to claim 1 in which said catalyst is supported on a solid carrier.

18. A process according to claim 1 in which said catalyst is introduced into said reduction zone in aqueous solution.

* * * * *

UNITED STATES PATENT OFFICE
CERTIFICATE OF CORRECTION

Patent No. 3,916,805　　　　　　　　　　Dated November 4, 1975

Inventor(s) Charles D. Kalfadelis et al

It is certified that error appears in the above-identified patent and that said Letters Patent are hereby corrected as shown below:

On the Title Page [75] should read:

Charles D. Kalfadelis of Reading, Pennsylvania and

Alvin Skopp of Clark, New Jersey.

Signed and Sealed this second Day of March 1976

[SEAL]

Attest:

RUTH C. MASON
*Attesting Officer*

C. MARSHALL DANN
*Commissioner of Patents and Trademarks*